No. 705,664. Patented July 29, 1902.
F. GOOCH.
BICYCLE ATTACHMENT.
(Application filed Feb. 24, 1902.)
(No Model.)
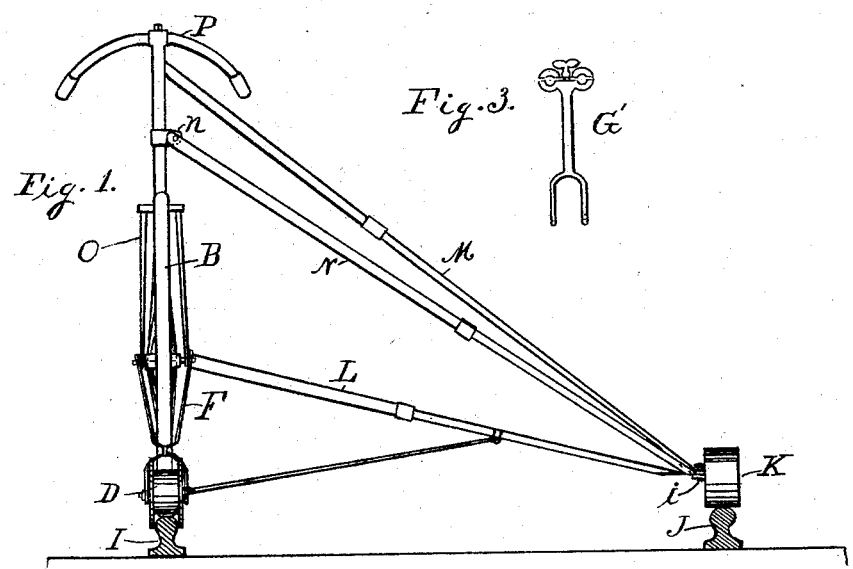
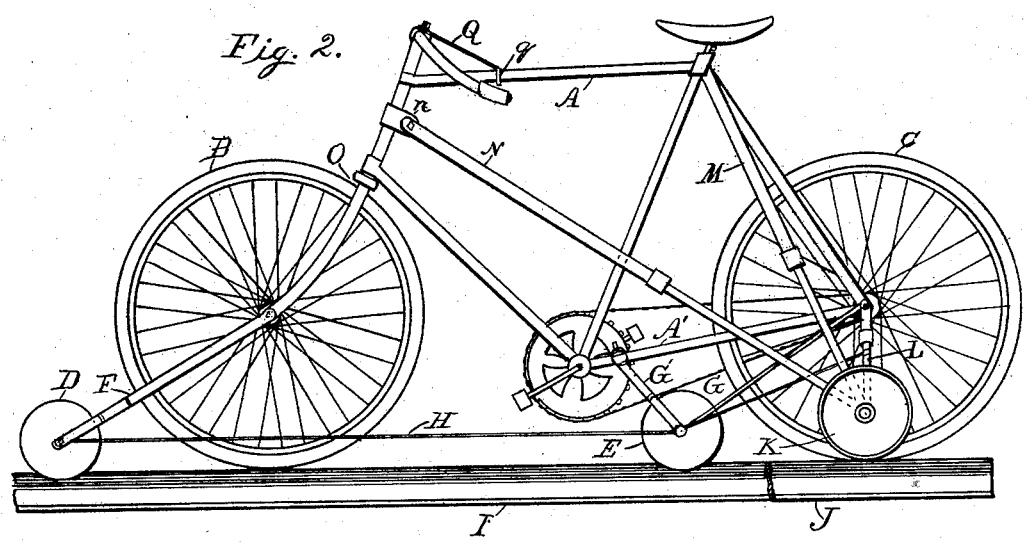
WITNESSES:
INVENTOR
Frank Gooch.
BY
Thomas P. Simpson.
ATTORNEY

UNITED STATES PATENT OFFICE.

FRANK GOOCH, OF SHELBURN, OREGON.

BICYCLE ATTACHMENT.

SPECIFICATION forming part of Letters Patent No. 705,664, dated July 29, 1902.

Application filed February 24, 1902. Serial No. 95,224. (No model.)

*To all whom it may concern:*

Be it known that I, FRANK GOOCH, a citizen of the United States, residing at Shelburn, in the county of Linn and State of Oregon, have invented certain new and useful Improvements in Bicycle Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to attachments whereby a bicycle may be run on one of the tracks of a railroad.

Figure 1 of the drawings is an elevation showing the bicycle laterally braced to a flangeless wheel on the opposite rail; Fig. 2, an elevation showing the fork and rod connections; Fig. 3, a detail view of a fork hereinafter fully described.

In the drawings, A represents the bicycle-frame, B C the wheels, and D E two double-flanged guide-wheels, one in front of each bicycle-wheel. The spindles of these guide-wheels are connected by forks F G with the shafts of the wheels B C, while the wheel E is connected by a fork G' with the fork A' of the bicycle. The forks F G G' are secured by clamps and thumb-nuts to the ends of said spindles and shafts, while the forks G G' form a brace to keep the face of wheel E from touching the rail, although the flanges extend below it on each side.

H H are two parallel rods which connect the spindles with each other and have a hole in each end to enable them to be slipped on the ends of the spindles and there to be fastened by a jam-nut. By this means the front guide-wheel D is held up with its face above the rail, while one of the flanges projects on each side thereof.

I J are the rails of a track, on one of which runs the bicycle-wheels B C and the guide-wheels, while on the other runs the unflanged wheel K, which is held thereto by the lateral braces L M N. The rod L runs to the unflanged wheel K from the spindle of the bicycle-wheel C and is connected with one of the ends of each of the other rods. The rod M runs to the end of the rod L, where it is secured, while it comes from the bolt which holds the seat-post. N is another brace-rod, fastened to the frame A by a hinged clip *n* between the crotch of the front fork O and the handle-bar P. All the rods L M N are fastened together by one small bolt *i* passing through them, so as to hold the bicycle upright, while Q is a short fork fastened to the handle-bar post with a screw at one end. At the other end are two arms *q*, of which one drops on each side of the top bar of frame A. The purpose of this device is to keep the steering-wheel B rigidly in the plane of the frame.

The rods L M N are tubular and made in sections to telescope together, while the guide-wheels D E, with their forks, need not be detached from the bicycle. The front guide-wheel is fastened up to the handle-bar and the rear one turned up behind the seat, while the short tubes are taken off and put in a sack with the unflanged wheel. This renders the bicycle in condition to be propelled on any ordinary road.

Having thus described all that is necessary to a full understanding of my invention, what I claim as new, and desire to protect by Letters Patent, is—

1. The combination with a bicycle, of a flanged guide-wheel in front of each bicycle-wheel, the forks F G G', which respectively connect the guide-wheels D E with the axles of the front and rear wheels of the bicycle and with the fork A', rods H H, unflanged wheel K and lateral brace-rods L M N, as and for the purpose set forth.

2. The fork G' combined with the guide-wheel E and the bicycle-fork A' as shown and described.

3. The fork Q having the arms *q q* at one end and clamped at the other to the handle-bar, for the purpose set forth.

In testimony whereof I affix my signature in presence of two witnesses.

FRANK GOOCH.

Witnesses:
L. E. MILLER,
E. J. MILLER.